United States Patent
Mizuno

(10) Patent No.: US 8,559,689 B2
(45) Date of Patent: Oct. 15, 2013

(54) MEDICAL IMAGE PROCESSING APPARATUS, METHOD, AND PROGRAM

(75) Inventor: Osamu Mizuno, Minato-ku (JP)

(73) Assignee: FUJIFILM Corporation, Tokyo (JP)

( * ) Notice: Subject to any disclaimer, the term of this patent is extended or adjusted under 35 U.S.C. 154(b) by 444 days.

(21) Appl. No.: 12/843,231

(22) Filed: Jul. 26, 2010

(65) Prior Publication Data

US 2011/0019886 A1   Jan. 27, 2011

(30) Foreign Application Priority Data

Jul. 27, 2009   (JP) .................. 2009-174080

(51) Int. Cl.
*G06K 9/00* (2006.01)

(52) U.S. Cl.
USPC .......................................... 382/131; 382/128

(58) Field of Classification Search
USPC .......................................... 382/131
See application file for complete search history.

(56) References Cited

U.S. PATENT DOCUMENTS

| | | | |
|---|---|---|---|
| 6,185,320 B1 * | 2/2001 | Bick et al. | 382/132 |
| 6,795,521 B2 * | 9/2004 | Hsu et al. | 378/4 |
| 6,813,375 B2 * | 11/2004 | Armato, III et al. | 382/131 |
| 7,583,829 B2 | 9/2009 | Kiraly et al. | |
| 8,098,911 B2 * | 1/2012 | Chefd'hotel et al. | 382/128 |
| 2009/0252395 A1 * | 10/2009 | Chan et al. | 382/131 |

FOREIGN PATENT DOCUMENTS

JP   2009-89847 A   4/2009

* cited by examiner

*Primary Examiner* — Hiep V Nguyen

(74) *Attorney, Agent, or Firm* — Sughrue Mion, PLLC

(57) ABSTRACT

A method of detecting a pleural plaque candidate from a medical image, which includes the steps of obtaining a medical image representing a subject, extracting a lung field area from the obtained medical image, comparing a contour of the extracted lung field with a comparison contour obtained by causing an active curve, having an initial shape in the lung field area and repeats deformation according to a certain deformation trend, to converge after repeating the deformation and detecting a depressed portion of the lung field, and determining the detected depressed portion as a first pleural plaque candidate.

11 Claims, 10 Drawing Sheets

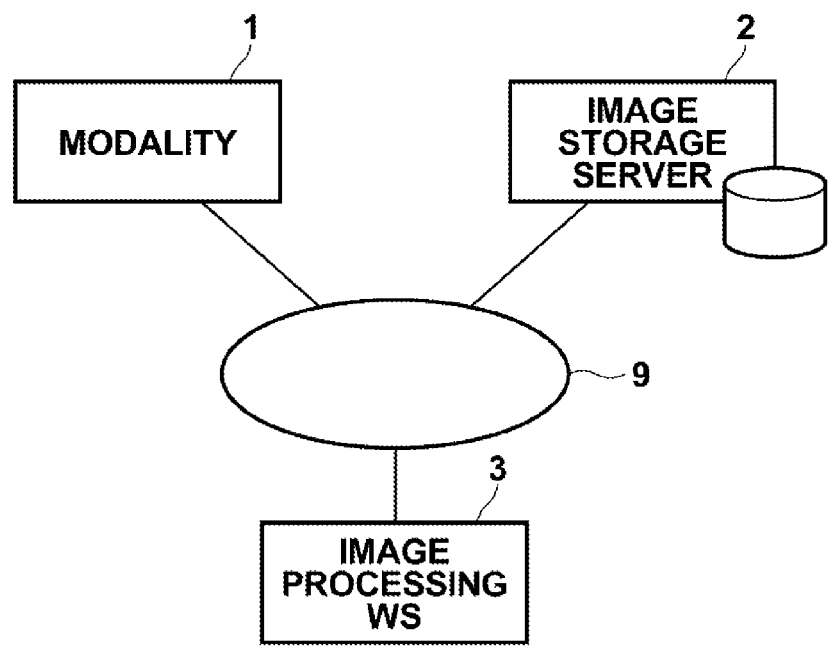
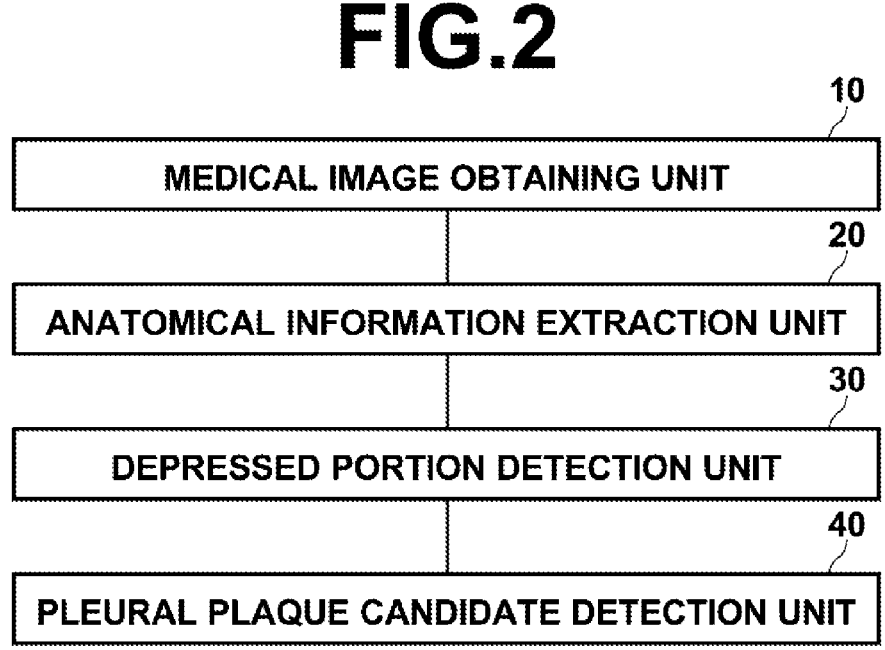

- START
- S101: OBTAIN MEDICAL IMAGE
- S102: EXTRACT LUNG FIELD AREA $S_0$
- S103: SET CLOSED CURVE, INCLUDING LUNG FIELD AREA, AS INITIAL SHAPE
- S104: CALCULATE LUNG FIELD COMPARISON CONTOUR $S_n$ USING ACTIVE CONTOUR
- S105: CALCULATE DEPRESSED AREA THROUGH COMPARISON BETWEEN LUNG FIELD AREA $S_0$ AND COMPARISON CONTOUR $S_n$
- S106: DETECT DEPRESSED AREA AS FIRST PLEURAL PLAQUE CANDIDATE $P_1$
- END

MEDICAL IMAGE PROCESSING APPARATUS, METHOD, AND PROGRAM

BACKGROUND OF THE INVENTION

1. Field of the Invention

The present invention generally relates to a medical image processing apparatus and method, and more particularly to a medical image processing apparatus and method for detecting a pleural plaque (pleural thickening plaque). The invention also relates to a computer readable recording medium on which is recorded a program for causing a computer to realize a function corresponding to the invention.

2. Description of the Related Art

Recently, there has been a demand, in the medical field, for measures to detect a pleural plaque (pleural thickening plaque) that causes calcified thickening of parietal pleura by image diagnosis.

In order to find a pleural plaque, as is common to a general diagnosis of a lesion site, a radiological reader interprets a medical image of a subject to find a lesion site or observes the state of the lesion site to find an abnormal tumor pattern. There have been possibilities that such abnormal patterns are overlooked due to the difference in image interpretation ability among radiological readers who observe/interpret radiation images or misapprehended due to subjective judgment of the radiological readers.

Consequently, in the image diagnosis of pleural plaques, a computer-assisted technology for accurately detecting such pleural plaques is demanded.

For example, a method of generating a medical image in which, in order to confirm an abnormal pattern candidate area in a lung field, a nodular area which is an abnormal pattern candidate area is identified, and a malignant region is depicted by extracting an irregular portion, a low luminance portion, and a high luminance portion of the nodular area is disclosed as described, for example, in Japanese Unexamined Patent Publication No. 2009-089847.

Further, a method in which a CT imaging is performed by administering a contrast agent and an abnormal region (embolus) in a lung field is automatically detected is also disclosed as described, for example, in U.S. Pat. No. 7,583,829.

The method disclosed in Japanese Unexamined Patent Publication No. 2009-089847, however, can not directly detect an abnormal pattern itself because an abnormal pattern is found by radiological reading first and then an abnormal region is confirmed.

The method disclosed in U.S. Pat. No. 7,583,829 has a problem that an abnormal pattern can be detected by image diagnosis only in a limited area adjacent to a contrast enhanced blood vessel and an abnormal pattern present in an area not contrast enhanced can not be detected. Further, the method requires CT imaging by administering a contrast agent, causing a problem of a burden on a patient.

In view of the circumstances described above, it is an object of the present invention to provide a medical image processing apparatus and method capable of accurately detecting a pleural plaque candidate by detecting a pleural plaque candidate through the expansion of diagnosable image area and a reduced burden of contrast agent administration on a patient. It is a further object of the present invention to provide a computer readable recording medium on which is recorded a program for causing a computer to realize a function corresponding to the invention.

SUMMARY OF THE INVENTION

A medical image processing apparatus according to the present invention is an apparatus, including:

a medical image obtaining unit that obtains a medical image representing a subject;

an anatomical information extraction unit that extracts a lung field area from the obtained medical image;

a depressed portion detection unit that compares a contour of the extracted lung field with a comparison contour obtained by causing an active curve, having an initial shape in the lung field area and repeats deformation according to a certain deformation trend, to converge after repeating the deformation and detects a depressed portion of the lung field; and a pleural plaque candidate detection unit that determines the detected depressed portion as a first pleural plaque candidate.

A medical image processing method according to the present invention is a method, including the steps of:

obtaining a medical image representing a subject;

extracting a lung field area from the obtained medical image;

comparing a contour of the extracted lung field with a comparison contour obtained by causing an active curve, having an initial shape in the lung field area and repeats deformation according to a certain deformation trend, to converge after repeating the deformation and detecting a depressed portion of the lung field; and determining the detected depressed portion as a first pleural plaque candidate.

A computer readable recording medium of the present invention is a medium on which is recorded a program for causing a computer to function as:

a medical image obtaining unit that obtains a medical image representing a subject;

an anatomical information extraction unit that extracts a lung field area from the obtained medical image;

a depressed portion detection unit that compares a contour of the extracted lung field with a comparison contour obtained by causing an active curve, having an initial shape in the lung field area and repeats deformation according to a certain deformation trend, to converge after repeating the deformation and detects a depressed portion of the lung field; and a pleural plaque candidate detection unit that determines the detected depressed portion as a first pleural plaque candidate.

For the "medical image", images obtained by CT, MRI, PET and an ultrasonic tomographic imaging apparatus, and the like may be used. In the case of images obtained by CT or MRI, axial cross-sectional images representing cross-sections orthogonal to the body axis are generally used.

The "anatomical information extraction unit" is an image processing unit that extracts, for example, an anatomical structure of a region, such as a lung or the like, from the image information of a subject and may further include a function to appropriately extract necessary information from a medical image. For example, the unit may have a function to extract, with respect to a lung field peripheral area including a lung field, the contour of a rib or sternum, the thickness of the lung field peripheral area, a contour of an intercostal vein, density of the lung field peripheral area of a medical image.

Preferably, the medical image processing apparatus of the present invention further includes a learned image storage unit that records a learned image obtained by learning image data that include lung field related images representing normal lung field areas, and an anatomical difference detection unit that compares the detected lung field area with the learned image and detects an anatomical information difference between them, and the pleural plaque candidate detection unit is a unit that further determines the detected anatomical information difference as a second pleural plaque candidate.

The term "anatomical information" as used herein may include, for example, the length, area, shape, density of a specific region, such as a lung or the like, recognized from a medical image.

Here, "an anatomical information difference between them" may be obtained by comparing a certain anatomical measurement value representing at least one of the length, area, and density of a specific portion of a recognized lung field or lung field peripheral area between them. The anatomical measurement values may include not only a value obtained by measuring a recognized predetermined structure in an image but also a secondary calculated value, such as a ratio using values obtained by the measurement.

Preferably, the obtained medical image includes a lung field peripheral area between at least either one of a rib and sternum and a lung field, and the anatomical difference detection unit is a unit that compares, instead of the lung field area, at least either one of a signal value of the lung field peripheral area and a thickness of the lung field peripheral area of the medical image with the learned image.

The term "a signal value of the lung field peripheral area" as used herein refers to a value representing the density of a medical image and, for example, a CT value of a CT image may be used. When a two-dimensional image is used, the shortest distance between a lung field contour and a bone may be used as an index of "a thickness of the lung field peripheral area". The signal value of the lung field peripheral area and the thickness of the lung field peripheral area may be extracted by the anatomical information extraction unit.

Preferably, the medical image processing apparatus of the present invention further includes an uneven portion detection unit that detects, by calculating roughness of a peripheral wall of the lung field area of the detected lung field area and comparing a calculated roughness value with a predetermined value, an uneven portion of the peripheral wall of the lung field area, and the pleural plaque candidate detection unit is a unit that further determines the detected uneven portion as a third pleural plaque candidate.

Preferably, the obtained medical image includes a two-dimensional image, and the uneven portion detection unit is a unit that provides divided curves by dividing the contour of the extracted lung field of the two-dimensional image and detects a specific section in which the length of a divided curve is greater, by more than a predetermined value, than the distance between two endpoints of the divided curve as an uneven portion.

A general method of obtaining a length of a curve connecting two points may be used for obtaining "the length of a divided curve". For example, a divided lung field contour may be approximated by an approximation formula and the length thereof may be calculated based on the approximation formula.

The obtained medical image may include a two-dimensional image, and the uneven portion detection unit may be a unit that provides divided curves by dividing the peripheral wall of the lung field area of the two-dimensional image into predetermined sections, disposes a plurality of points on each of the divided curves, produces a plurality of vectors by connecting adjacent points of the plurality of points, obtains an added-up value of angles, each being formed between adjacent vectors of the plurality of vectors, and detects a predetermined section in which the added-up value is greater than a predetermined value as an uneven portion.

The uneven portion detection unit may be a unit that determines the divided curves based on any one of a preset length, a ratio of a length of each of the divided curves to a path length of the contour of the lung field, and a predetermined angle from a center point within the lung field area.

The term "center point" as used herein refers to the point that indicates the center position of a lung field and may be the gravity center of the lung field or a point predetermined based on the contour of the lung field. The term "a predetermined angle from a center point within the lung field area" refers to that a plurality of straight lines is radially drawn passing through the center point and tilted in increments of a predetermined angle, and the lung field contour is divided at the intersection between the lung field contour and each of the plurality of liner lines.

The term "based on a preset length" refers to that the lung field contour is divided such that the path length of each divided curve becomes a predetermined length or the distance between the two endpoints of each divided curve becomes a predetermined length.

Preferably, the medical image includes a plurality of two-dimensional image or a three-dimensional image, and the depressed portion detection unit is a unit that detects the depressed portion from the plurality of two-dimensional image or the three-dimensional image.

Preferably, the medical image includes a plurality of two-dimensional image and a three-dimensional image, the depressed portion detection unit is a unit that detects the depressed portion from a first two-dimensional image and obtains, according to the detection of the depressed portion, another comparison contour calculated using the three-dimensional image or a second two-dimensional image, which is different from the first two-dimensional image, that includes an adjacent area of the depressed portion from the anatomical information extraction unit, and further detects another depressed portion in the adjacent area of the depressed portion using the another comparison contour, and the pleural plaque candidate detection unit is a unit that determines the depressed portion and the another depressed portion as the first pleural plaque candidate.

According to the medical image processing apparatus and method, and a computer readable recording medium on which is recorded a program for causing a computer to realize a function corresponding to the invention, a medical image representing a subject is obtained, a lung field area is extracted from the obtained medical image, a contour of the extracted lung field is compared with a comparison contour obtained by causing an active curve, having an initial shape in the lung field area and repeats deformation according to a certain deformation trend, to converge after repeating the deformation and a depressed portion of the lung field is detected, and the detected depressed portion is determined as a first pleural plaque candidate. This allows a depressed portion to be detected from a contour of a lung field, and the depressed portion is determined as a pleural plaque candidate. Thus, pleural plaque candidate detection may be performed on the entire contour of a lung field without administering a contrast agent to a patient, whereby the burden on the patient may be reduced and the diagnosis may be performed accurately.

If the medical image processing apparatus of the present invention includes a learned image storage unit that records a learned image obtained by learning image data that include lung field related images representing normal lung field areas, and an anatomical difference detection unit that compares the detected lung field area with the learned image and detects an anatomical information difference between them, and the pleural plaque candidate detection unit is a unit that further determines the detected anatomical information difference as a second pleural plaque candidate, a pleural plaque candidate may be detected based not only on a depressed portion but also on a comparison with a normal learned image so that the diagnosis may be performed more accurately.

Further, if the obtained medical image includes a lung field peripheral area between at least either one of a rib and sternum and a lung field, and the anatomical difference detection unit is a unit that compares, instead of the lung field area, at least either one of a signal value of the lung field peripheral area and a thickness of the lung field peripheral area of the medical image with the learned image, pleural plaque candidate detection is performed based not only on a depressed portion but also on a comparison of the lung field peripheral area with that of a normal learned image so that a pleural plaque candidate may be detected accurately.

Still further, if the medical image processing unit of the present invention further includes an uneven portion detection unit that detects, by calculating roughness of a peripheral wall of the lung field area of the detected lung field area and comparing a calculated roughness value with a predetermined value, an uneven portion of the peripheral wall of the lung field area, and the pleural plaque candidate detection unit is a unit that further determines the detected uneven portion as a third pleural plaque candidate, pleural plaque candidate detection is performed based not only on a depressed portion but also on uneven information, so that a pleural plaque candidate may be detected accurately.

Further, if the medical image includes a plurality of two-dimensional image or a three-dimensional image, and the depressed portion detection unit is a unit that detects the depressed portion from the plurality of two-dimensional image or the three-dimensional image, pleural plaque candidate detection is performed based on a plurality of information sources, so that a pleural plaque candidate may be detected accurately.

Still further, if the medical image includes a plurality of two-dimensional image and a three-dimensional image, and the depressed portion detection unit is a unit that detects the depressed portion from a first two-dimensional image and obtains, according to the detection of the depressed portion, another comparison contour calculated using the three-dimensional image or a second two-dimensional image, which is different from the first two-dimensional image, that includes an adjacent area of the depressed portion from the anatomical information extraction unit, and further detects another depressed portion in the adjacent area of the depressed portion using the another comparison contour, and the pleural plaque candidate detection unit is a unit that determines the depressed portion and the another depressed portion as the first pleural plaque candidate, then, when a depressed portion is detected from a first two-dimensional image, the depressed portion information may be detected, according to the detection, from the three-dimensional image or a second two-dimensional image, which may eliminate the need to perform the detection of a depressed portion each time for each of the two-dimensional images or the three-dimensional image and a depressed portion may be detected accurately without excessively increasing the load in terms of calculation and time.

BRIEF DESCRIPTION OF THE DRAWINGS

FIG. 1 is a schematic configuration diagram of a three-dimensional medical image processing system according to an embodiment of the present invention.

FIG. 2 is a block diagram of an image processing function according to a first embodiment.

DESCRIPTION OF THE PREFERRED EMBODIMENTS

Figure 3:
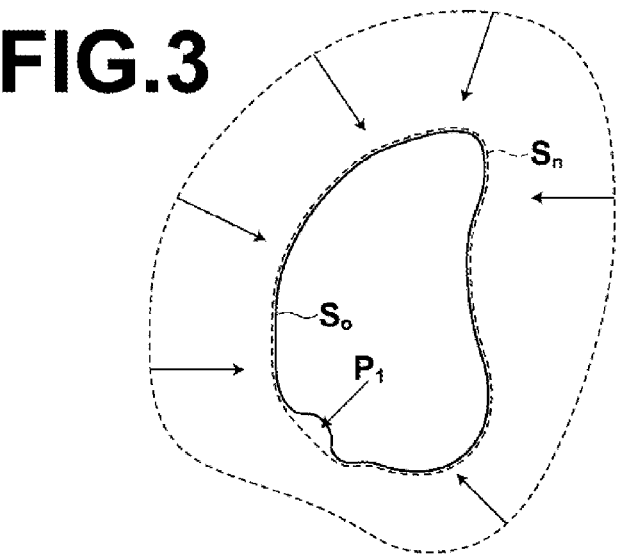
FIG. 3 is a conceptual diagram of generation of a comparison contour by an active contour technology and detection of a pleural plaque.

Hereinafter, a first embodiment of the present invention will be described with reference to the accompanying drawings.

FIG. 1 is a hardware configuration diagram of a medical image processing apparatus, illustrating an overview thereof. As shown in FIG. 1, the system includes modality 1, image storage server 2, and image processing workstation 3 communicatably linked via network 9.

Modality 1 is equipment for obtaining a medical image V representing a test body, and more specifically it is CT equipment, MRI equipment, PET, ultrasonic diagnostic equipment, or the like.

Image storage server 2 is a computer for storing/managing a medical image V obtained by modality 1 and a medical image V generated in workstation 3 by image processing, and includes an external large capacity recording medium and database management software (for example, ORDB (object relational database) management software).

In the present embodiment, a software program that provides a function to detect a pleural plaque candidate (to be described in detail later) using image recognition function for recognizing a certain structure in a test body represented by an image transmitted from modality 1 and a recognition result is also installed. Note that, in each embodiment, the function of the present invention may be performed by a computer using an externally installed program. In this case, a group of information including the program may be provided by a recording medium, such as a CD-ROM, a flash memory, a FD, or the like, or supplied from an external recording medium through a network, and installed on the computer.

Image processing workstation 3 is a computer for performing image processing on a medical image V obtained from modality 1 or image storage server 2 according to a request from a radiological reader and displaying an image generated by the image processing. Image processing workstation 3 includes, in particular, an input device, such as a keyboard or a mouse, for use by a radiological reader to input a request, a main storage unit with a sufficient capacity for storing an obtained medical image V, and a display for displaying a generated image.

The image data storage format and communication between each component of the system via network 9 is based on a protocol, such as DICOM (digital imaging and communications in medicine) or the like.

A configuration related to a medical image processing function according to a first embodiment of the present invention will now be described.

FIG. 2 is a block diagram illustrating a portion of workstation 3 related to the medical image processing function according to the first embodiment of the present invention. As illustrated in FIG. 2, image processing workstation 3 includes medical image obtaining unit 10 that obtains a medical image V via network 9 in response to a request from modality 1 or image storage server 2, anatomical information extraction unit 20 that extracts a lung field area from the obtained medical image, depressed portion detection unit 30 that compares a contour $S_0$ of a lung field of the detected lung field area with a comparison contour $S_n$ of a lung field calculated by a dynamic contour extraction method and detects a depressed portion of the lung field, and pleural plaque candidate detection unit 40 that determines the extracted depressed portion as a pleural plaque candidate.

Figure 14:
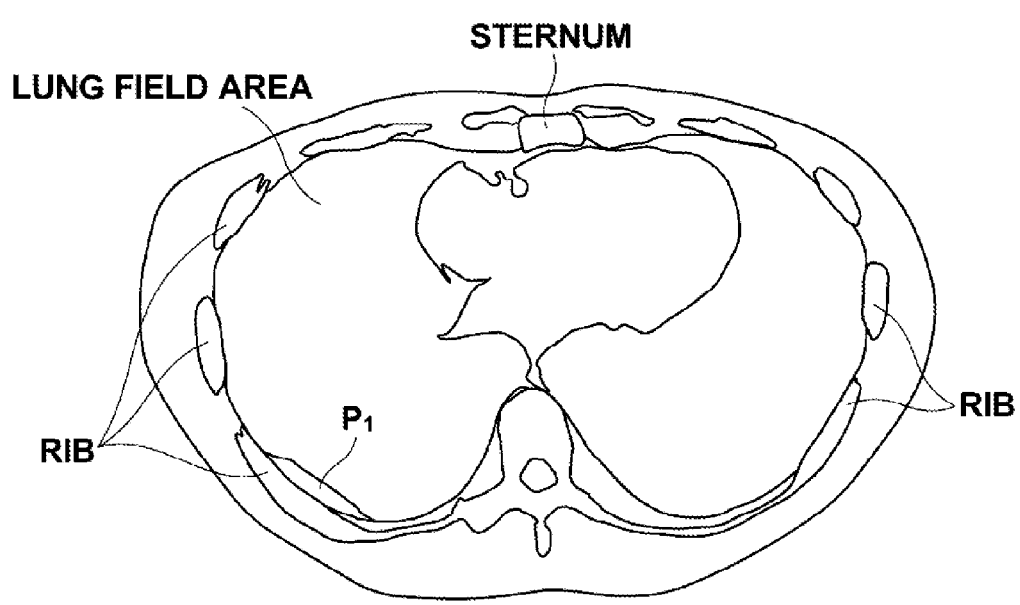
FIG. 14 is conceptual diagram for explaining lung fields and a pleural plaque.

An example of pleural plaque case is shown in FIG. 14. The pleural plaque, in general, is irregular white plate like thickening developed in the parietal pleura, which characteristically appears in morphology, size, anatomical position, and inner density in a diagnostic image. The first embodiment focuses attention on morphological characteristics of the pleural plaque. More specifically, a case of parietal pleura thickening can be observed as a depressed portion ($P_1$ in FIG. 14) of a lung field contour $S_0$ in a CT image. Consequently, the present embodiment detects a depressed portion of a lung field contour $S_0$ as a pleural plaque candidate $P_1$ by a dynamic contour extraction method, thereby providing a diagnostic support.

Figure 4:
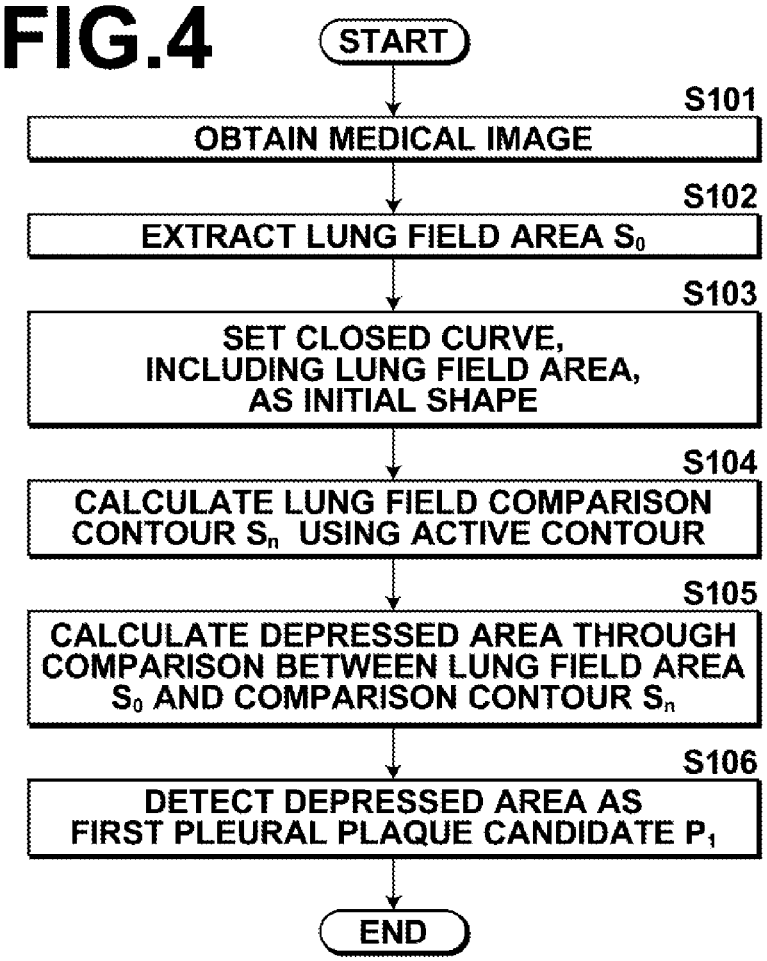
FIG. 4 is a flow diagram for explaining the flow of image processing in the first embodiment.

A characteristic portion of the operation of the first embodiment will now be described according to the flowchart of FIG. 4.

First, medical image obtaining unit 10 obtains a medical image V via network 9 in response to a request from modality 1 or image storage server 2 (S101). The medical image V includes a lung field area and is formed of a plurality of two-dimensional images $V_2$ or a three-dimensional image $V_3$ constituted by a stack of a plurality of two-dimensional tomographic images.

Then, anatomical information extraction unit 20 detects a lung field area, that is, a lung field contour $S_0$ of the medical image obtained (S102).

Any know method may be used for the lung field recognition and a method in which a position where a density value exceeds a predetermined threshold or a position where a change in first derivative becomes maximum is searched for on a smoothed chest X-ray image from the center to the outside as described, for example, in Japanese Patent No. 3433928 may be used. Alternatively, a method of detecting, in a chest X-ray image, a portion having a predetermined density range determined by a predetermined mountain shape and area in a density histogram of the image as a lung field portion as described, for example, in Japanese Patent No. 2987633. Further, a method in which a coarse contour is detected by template matching using a template having a shape substantially similar to the contour of an average thoracic cage, then a partial contour is detected accurately based on the coarsely detected partial contour, and the accurately detected partial contour is detected as a partial contour as described, for example, in Japanese Unexamined Patent Publication No. 2003-006661 may also be used.

Then, a depressed portion detection unit 30 sets a closed curve, as an initial shape, which includes a lung field area on the medical image V (S103) and generates a lung field comparison contour $S_n$ calculated based on an active contour extraction technology (S104).

The active contour extraction method is a method that sets a model of a contour to be extracted, then assumes a curve (active curve) that repeats deformation according to a certain deformation trend, and extracts a target contour by determining the deformation trend such that the contour model is approximated to the target contour, i.e., the active curve converges to the target contour by repeating deformation. Well known active contour extraction methods include SNAKES method and level set method.

In the first embodiment, a comparison contour is detected using the SNAKES method. The SNAKES method tries to determine the deformation trend of an active curve by defining the energy of the curve and quantitatively evaluating the state of the curve. The energy is defined so as to become minimal when the active curve corresponds to a target contour. This allows the target contour to be extracted by finding a stable state in which the energy of the active curve becomes minimal. Here, the speed and accuracy of the contour extraction process depend on how to determine the deformation trend (M. Kass et al., "SNAKES: ACTIVE CONTOUR MODELS", International Journal of Computer Vision, Vol. 1, No. 4, pp. 321-331, 1988).

A closed curve that includes a lung field area may be set, for example, by providing a closed curve template having a shape similar to a contour of an average lung and sufficiently enlarging the closed curve template to include the contour $S_0$ of the detected lung field inside of the template, thereby using as the initial shape. Any other known methods capable of setting a closed curve that includes the contour $S_0$ of a detected lung field inside thereof may also be used.

Then, the closed curve is gradually reduced to obtain a comparison contour $S_n$ that fits the boundary of the lung field (S104). The order of detecting the contour $S_0$ of the detected lung field and comparison contour $S_n$ is not limited to the embodiments shown in FIGS. 4, 6, 8, and 12. The contour $S_0$ of the detected lung field may be detected after detecting the comparison contour $S_n$ or the contour $S_0$ of the lung field and comparison contour $S_n$ may be detected in parallel.

Then, a comparison is made between the contour $S_0$ of the detected lung field and comparison contour $S_n$. FIG. 3 is a conceptual diagram representing a comparison contour $S_n$ obtained by the active contour extraction technology and a contour $S_0$ of a detected lung field. The contour obtained by the active contour extraction technology is indicated by a broken line and the contour $S_0$ of the detected lung field is indicated by a solid line. In the active contour extraction technology, a closed curve is gradually reduced to draw a smooth curve so that a contour that completely fits a sharply bent portion of the detected lung field can not be drawn. This causes a comparison contour $S_n$ not to be fit a depressed portion of the lung field, which is a pleural plaque candidate, as illustrated in FIG. 3. Consequently, through comparison between the comparison contour $S_n$ and the detected lung field contour $S_0$, portions of the two contours that do not match with each other may be detected as a depressed portion. In this way, a depressed portion may be extracted through the comparison between $S_0$ and $S_n$ (S105). A determination as to whether or not a lung field contour $S_0$ and comparison contour $S_n$ are matched with each other may be made using any known method. For example, a sample point may be provided on a contour $S_0$ of a detected lung field and the determination may be made based on whether or not the sample point is on the comparison contour $S_n$.

When calculating a comparison curve based on the active contour extraction technology, it is preferable to appropriately set a coefficient that determines the movement of the active contour. This may prevent the comparison curve based on the active contour extraction technology from unnecessarily intruding into a depressed portion of a lung field and fitting, whereby the depressed portion may be detected accurately. In the present embodiment, a coefficient of a Snakes model will be set in the following manner in order to detect a recess portion accurately.

Typically, the image energy sum E on Snakes that determines the movement of the Snakes is given by Formula (1) below.

$$E = \int_0^1 \{E_{int}(v(s)) + E_{image}(v(s)) + E_{con}(v(s))\} ds \quad (1)$$

where, Snakes: $v(s)=(x(s), y(s))$, s: 0-1 s is a parameter on a closed curve, in which a position of S=0 is the starting point and a position of s=1 is the end point (in the case of a closed curve, the position of s=0 and the position of s=1 correspond to each other).

Here, the internal energy $E_{int}$ is an internal energy representing continuity and smoothness of the closed curve, and a term for adjusting the expansion/contraction of v (s). $E_{image}$ is an image grayscale energy based on an edge intensity of the image. $E_{con}$, is an external energy for reducing the closed curve.

The internal energy $E_{int}$ is defined by a weighted linear sum with weights of square length $v_s$ of the Snakes itself and square curvature $v_{ss}$ and is given by Formula (2) below.

$$E_{int}(v(s))=\alpha|v_s|^2+\beta|v_{ss}|^2$$

$$v_s=dv/ds, v_{ss}=d^2v/ds^2 \quad (2)$$

where, $\alpha$ and $\beta$ are constants representing weights of the respective energies. In the present embodiment, each peak of the Snakes may have a smooth curve by setting the coefficients of $E_{int}$ $\alpha<\beta$, and the comparison curve based on the active contour extraction technology is prevented from unnecessarily intruding into a depressed portion of a lung field, whereby the depressed portion can be detected. By way of example, it is preferable that the ratio between $\alpha$ and $\beta$ is 0.5:1.

Further, it is preferable that a depressed portion is detected from a portion of a lung field contour $S_0$ and not from the entire lung field contour $S_0$. More specifically, it is preferable that a depressed portion is detected from a remaining contour of the lung field contour $S_0$ excluding a contour on the side that includes the heart. The reason is to prevent a contour of a different organ from being erroneously detected as a depressed portion and to improve accuracy of the detection because the lung field contour $S_0$ may sometimes includes a contour of heart or blood vessel, as illustrated in FIG. 14.

An example method of removing a contour of a heart from a lung field contour $S_0$ will now be described. A contour of a heart may be detected by a known method like that used for recognizing a lung field by anatomical information extraction unit 20, and a depressed portion may be detected by depressed portion detection unit 30 through a comparison between the lung field contour $S_0$ and comparison contour $S_n$ with respect only to a partial contour excluding the contour of the heart from the lung field contour $S_0$.

Alternatively, a depressed portion may be detected by recognizing a sternum area and a spine area in the detected medical image V by anatomical information extraction unit 20, providing specific points B1, B2 in the sternum area and spine area respectively, setting a specific point C1 on the lung field contour such that the distance between the point B1 and point C1 becomes minimal, setting a specific point C2 on the lung field contour such that the distance between the point B2 and point C2 becomes minimal, dividing the lung field contour $S_0$ at the determined C1 and C2, and making a comparison between a remaining contour of the lung field contour $S_0$ excluding a contour on the side that includes the heart and comparison contour $S_n$.

Note that the detection of a depressed portion from a portion of a lung field contour in the manner as described above may cover a sufficiently wide area of the external wall of the lung field in comparison with the case in which an abnormal pattern is detected only from an area adjacent to a blood vessel using a contrast agent.

Pleural plaque candidate detection unit 40 detects the detected depressed portion as a first pleural plaque candidate $P_1$ (S106).

The first pleural plaque candidate $P_1$ may be detected in the manner as described above. In this way, information related only to a lung field contour $S_0$ is used, which does not require administration of a contrast agent to a patient, whereby the burden on the patient and diagnostic cost may be reduced. Further, a pleural plaque candidate may be detected from a wide area with respect to the entirety of the pleura along the lung field contour $S_0$, whereby detection accuracy may be improved.

Hereinafter, a modification will be described. The modification is applicable to other embodiments without changing the principle.

A medical image V includes a plurality of two-dimensional images $V_2$ or a three-dimensional image $V_3$, and a depressed portion detection unit may detect a depressed portion from the plurality of two-dimensional images $V_2$ or the three-dimensional image $V_3$.

When a plurality of medical images $V_2$ is used for detecting a depressed portion, the depressed portion may be detected more accurately than in the case where only one two-dimensional image $V_2$ is used, because a pleural plaque candidate is detected based on a plurality of information sources. Preferably, the plurality of two-dimensional images $V_2$ is constituted by cross-sections taken from different positions or angles. When cross-sectional images taken from different positions or angles are used, a depressed portion may be detected from a wide area, and more accurately than in the case where two-dimensional images taken from one direction are used.

When a three-dimensional image $V_3$ is used for detecting a depressed portion as a modification of the present embodiment, the depressed portion is detected by applying a three-dimensional active contour model. An active balloon model may be used as the three-dimensional active contour model to obtain a contour of a three-dimensional medical image. The active balloon model is a model of the Snakes extended to a three-dimensional shell structure. While the Snakes extracts an edge of an object by gradually minimizing the energy from a two-dimensional grayscale image, the active balloon model reconstructs a plane of a three-dimensional object by gradually minimizing the energy from a sample point in a discrete three-dimensional space (K. Tsuchiya, et al., "3D Shape Reconstruction from Range Data Using Active Balloon Model and Symmetry Restriction", IEICE (D-II), J76-D-II, No. 9, pp. 1967-1976, 1993). When a three-dimensional image $V_3$ is used, an initial shape of 1280-hedron obtained by dividing each plane of a regular icosahedron into 64 is set by depressed portion detection unit 30 in step S103 and a three-dimensional shape of a lung field may be obtained as a comparison contour $S_n'$ when the energy of the entire model is minimized by repeating the minimization of internal energy, as in the two dimensional active contour extraction technology.

More specifically, the initial shape enclosing a lung field may be set in step S103, for example, by providing a three-dimensional shape template having a shape substantially identical to a contour of an average lung and sufficiently enlarging the three-dimensional shape template to include the detected lung field contour $S_0$ of the detected lung field inside of the template, thereby using as the initial shape. Any other known methods capable of setting a three-dimensional shape that includes the contour $S_0'$ of a detected lung field inside thereof may also be used. Further, a three-dimensional shape of the initial shape may be set at a position predetermined based on average anatomical position information.

Then, the initial shape is gradually reduced, in step s104, to obtain a comparison contour $S_n'$ that fits the boundary of the lung field. The order of detecting the contour $S_0'$ of the detected lung field and comparison contour $S_n'$ is not limited to the present embodiment. The contour $S_0'$ of the detected lung field may be detected after detecting the comparison contour $S_n'$ or the contour $S_0'$ of the lung field and comparison contour $S_n'$ may be detected in parallel.

Then, in step s105, a depressed portion may be calculated by comparing the comparison contour $S_n'$ obtained by the three-dimensional active contour technology to the three-dimensional lung field shape $S_0'$ obtained by reconstructing a lung field contour $S_0$ detected from a two dimensional tomographic image by the method described above into a three-dimensional shape and detecting a difference between the two shapes. In the three-dimensional active contour extraction technology, the initial shape of 1280-hedron is reduced so as to draw a smooth curve, so that a contour that completely fits a sharply bent portion of the detected three-dimensional lung field shape can not be drawn, as in the two-dimensional case. Consequently, through comparison between the comparison contour $S_n'$ and the detected lung field contour $S_0$, portions of the two contours that do not match with each other may be detected as a depressed portion.

As for the comparison method between the three-dimensional shapes $S_n'$ and $S_0'$, any known determination method for determining the similarity of three-dimensional shapes may be used. In the present embodiment, a sample point is arbitrarily provided on a three-dimensional shape of $S_0'$ and a determination is made as to whether or not the sample point is on the comparison contour $S_n'$ or the distance from the sample point to a plane of a polyhedron constituting the comparison contour $S_n'$ is smaller than a threshold value, and when the sample point is not on the comparison contour $S_n'$ and/or the distance from the sample point to a plane of a polyhedron constituting the comparison contour $S_n'$ is greater than or equal to the threshold value, a region adjacent to the sample point can be detected as a depressed portion.

As described above, when a depressed portion is detected from a three-dimensional image $V_3$, the entire shape and position of the depressed portion can be understood three-dimensionally, so that more information related to a pleural plaque candidate may be obtained than in the case where a pleural plaque candidate is detected from a two-dimensional image $V_2$ and good assistance in detecting a pleural plaque accurately may be provided.

In another modification of the present embodiment, pleural plaque candidate detection is performed using a two-dimensional medical image $V_2$ and if a pleural plaque candidate is detected, a depressed portion is detected separately using another two-dimensional medical image $V_2'$ or a three-dimensional image $V_3$ that includes information of an area adjacent to the pleural plaque candidate to determine the depressed portion as a first pleural plaque candidate $P_1$. This allows information of an area around the pleural plaque candidate detected first from a two-dimensional medical image $V_2$ to be obtained, whereby a pleural plaque candidate may be detected more accurately.

When a depressed portion is detected separately using another two-dimensional medical image $V_2'$ and the depressed portion detected is determined as a first pleural plaque candidate $P_1$, it is preferable that the another two-dimensional medical image $V_2'$ is a cross-section taken from a different position or angle. When cross-sectional images taken from different positions or angles are used, the depressed portion detected first from a two-dimensional medical image $V_2$ is detected again from a different position or angle, whereby more information related to the pleural plaque candidate may be obtained, resulting in more accurate detection.

When a depressed portion is detected separately using a three-dimensional medical image $V_3$ and the depressed portion detected is determined as a first pleural plaque candidate $P_1$, the position and size of the pleural plaque candidate detected may be understood three-dimensionally, so that more information related to the pleural plaque candidate may be obtained and good assistance in detecting a pleural plaque accurately may be provided.

When depressed portion detection is performed first using one two-dimensional image $V_2$ and, only if a pleural plaque candidate is detected, a depressed portion is detected again using another two-dimensional image $V_2'$ or a three-dimensional image $V_3$, the calculation speed may be increased and the computational load and amount of information to be stored may be reduced in comparison with the case in which a depressed portion is detected using a plurality of two-dimensional images or a three-dimensional image from the beginning, which may eliminate the need to perform the detection of a depressed portion each time with respect to each of the two-dimensional images or the three-dimensional image and a depressed portion may be detected accurately without excessively increasing the load in terms of calculation and time.

When a depressed portion is detected in one of the lung fields, it is preferable to further perform detection of another depressed portion on both lung fields. The pleural plaque is a bilateral disease and if a pleural plaque is detected in one of the lung fields, it is likely that the other lung field also has a pleural plaque. Therefore, if a pleural plaque is detected in one of the lung fields, depressed portion detection may further be performed on another two-dimensional image $V_2'$ or a three-dimensional image $V_3$ with respect to both lungs to improve detection accuracy.

Further, when a depressed portion is detected, additional information of the pleural plaque candidate may be obtained by separately calculating a depressed portion using another two-dimensional medical image $V_2'$ which includes an adjacent area of the depressed portion. Such information may include, for example, the size, position, and thickness of the pleural plaque. When a pleural plaque candidate is detected, the additional information may provide details of the pleural plaque candidate, that is, more accurate information related to the pleural plaque candidate may be provided.

Hereinafter, a second embodiment of the present invention will be described.

As described above, the pleural plaque is irregular white plate like thickening developed in the parietal pleura, which characteristically appears in morphology, size, and peripheral or inner density in a diagnostic image. The second embodiment focuses attention on the morphology and density of a pleural plaque and performs determination of a pleural plaque candidate using a normal medical image, in addition to the detection of a first pleural plaque candidate based on the depressed portion described in the first embodiment. Note that the hardware configuration is identical to that of the first embodiment.

A configuration related to a medical image processing function according to the second embodiment of the present invention will now be described.

Figure 5:
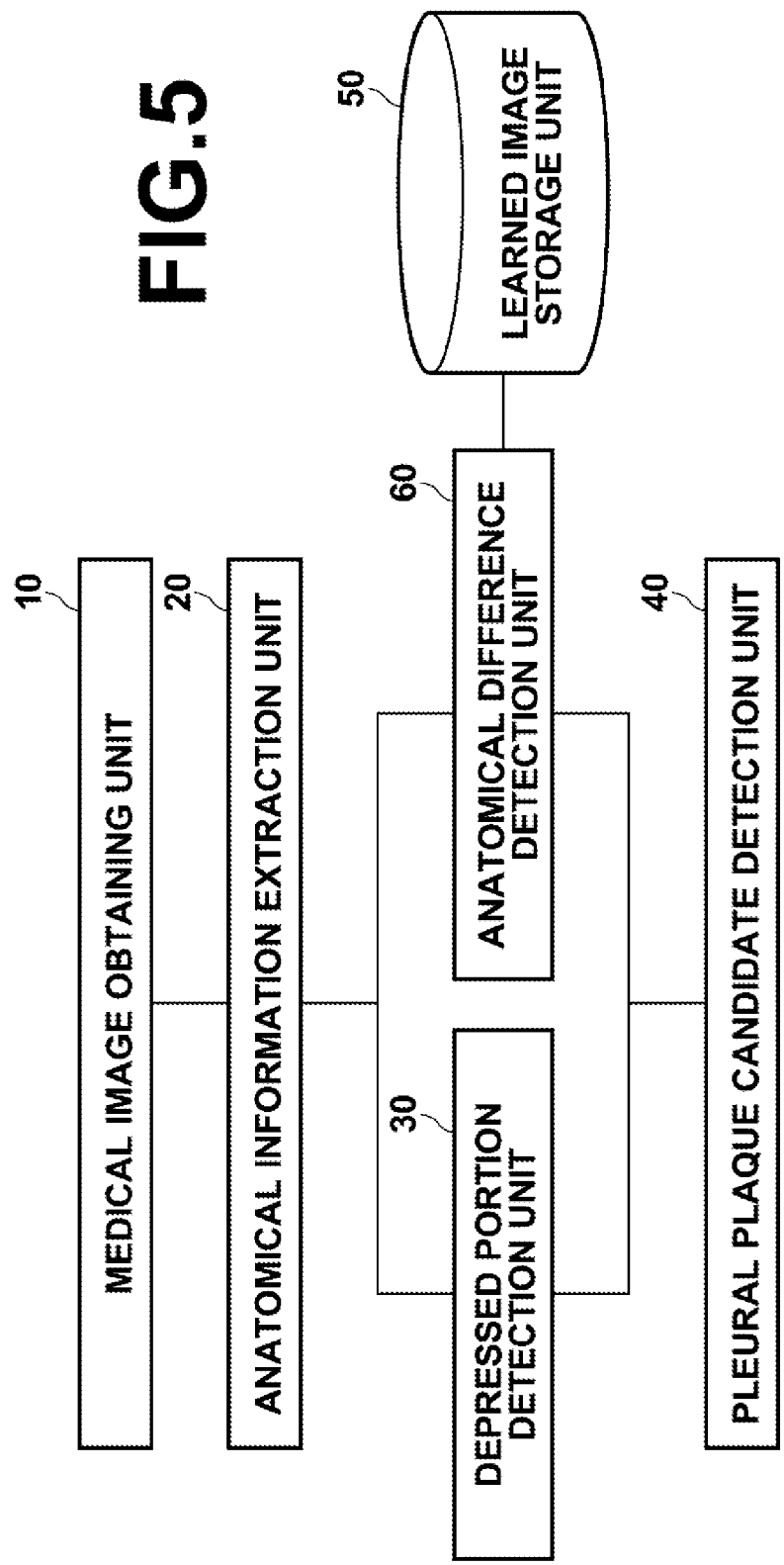
FIG. 5 is a block diagram of an image processing function according to a second embodiment.

FIG. 5 is a block diagram illustrating a portion of workstation 3 related to the medical image processing function according to the second embodiment of the present invention. As illustrated in FIG. 5, image processing workstation 3 includes learned image storage unit 50 for recording a learned medical image which includes a normal lung field and a lung field peripheral area R and anatomical difference detection unit 60 that extracts a learned image similar to a medical image V detected from learned image storage unit 50 and comparing anatomical characteristics between the extracted learned image and medical image V and detects an anatomical information difference, in addition to the components shown in FIG. 2. Each of the components identical to that shown in FIG. 2 operates in the identical manner to that of FIG. 2. Learned image storage unit 50 uses an appropriate recording medium, such as a hard disk, a flash memory, or the like.

As described above, the pleural plaque, in general, is irregular white plate like thickening developed in the parietal pleura. If such thickening is calcified, the calcified region shows different density from that of the region when it is normal. Further, the present inventor has found that the thickening of parietal pleura can be detected as a symptom in which an area between a lung field and a rib or sternum is thickened in a tomographic image ($P_1$ in FIG. 14). Consequently, in the second embodiment, lung field density in a medical image and an area R between a lung field and a rib or sternum (lung field peripheral area R) are compared with normal lung field density and normal lung field peripheral area R to detect an anatomical difference, and the difference is detected as a pleural plaque candidate, thereby providing diagnostic assistance. That is, when paying attention to pleural plaque density, a region having a density ratio to the density of normal image or a density difference from the density of normal image higher than a predetermined threshold value is determined to be a region in which a calcified pleural plaque is present. From the viewpoint of morphology, a portion of the lung field peripheral area R between a lung field contour $S_0$ and a rib or the sternum thicker than that of normal medical image is determined to be a pleural plaque candidate, since the pleural plaque is thickening developed in the parietal pleura.

Figure 6:
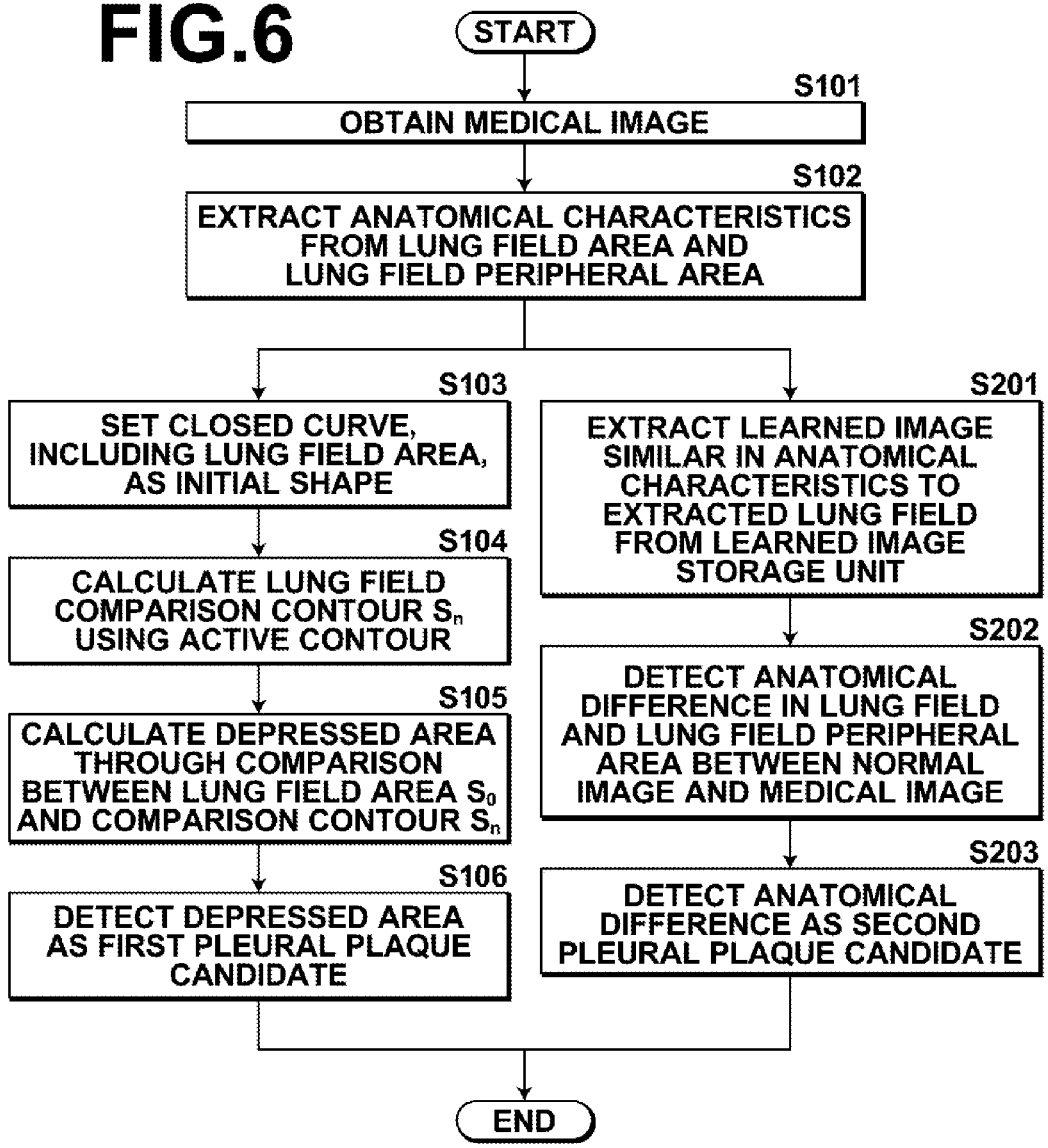
FIG. 6 is a flow diagram for explaining the flow of image processing in the second embodiment.

Hereinafter, a characteristic portion of the operation of the second embodiment will be described according to the flowchart of FIG. 6.

Step S101 is identical to that of the first embodiment. In the second embodiment, anatomical information extraction unit 20 extracts, in step S102, anatomical information of not only a lung field but also a lung field peripheral area R using a known method. As anatomical information of the lung field peripheral area R, at least contours of ribs and sternum are extracted using a known recognition method. Further, it is preferable that a contour of an intercostal vein is extracted from the lung field peripheral area R.

In the rib recognition, for example, the following methods may be used: a method in which a rib shadow is extracted by scanning a chest X-ray image using a line sensitive filter to extract a line figure, extracting a line corresponding to a rib shadow based on the position of the line figure in the X-ray image and the direction in which the line figure extends, and approximating a rib boundary line by quadratic approximation as described in IEICE Image Engineering Conference proceeding, IT72-24 (1972-10); a method in which an initial shape of a rib detected by edge detection (parabolic approximation shape detection) is projected to a rib shape model (any rib shape can be formed as a linear sum of average shape obtained from teacher data and a plurality of principal shapes obtained by principal component analysis of the teacher data) to obtain a model projection shape of the rib as described in Japanese Patent Application No. 2003-182093; and a method of recognizing a bone area of a lung field using a bone area recognition technology by CT values as described in Japanese Unexamined Patent Publication No. 2007-135858.

Next, using the lung field extracted in step S102 and a method like that described in Japanese Unexamined Patent Publication No. 2005-108195, a normal learned image having similarity in the position with the extracted lung field, which may be obtained by machine learning using AdaBoost, Support Vector Machine (SVM), or Artificial Neural Network (ANN), is extracted from learned image storage unit 50 (S201).

In the second embodiment, learned image storage unit 50 is a unit obtained through learning based on AdaBoost and using many types of characteristic amounts with respect to each of the learning samples constituted by a plurality of images known to be representing lung fields and peripheral areas thereof and a plurality of images known not to be representing lung fields and peripheral areas thereof using a method like that described in Japanese Unexamined Patent Publication No. 2005-108195. Many types of characteristic amounts may include, for example, the length, area, shape, orientation, and positional relationship of a predetermined anatomical structure (organ or bone) in the lung field.

As the learned image used for comparison, an image having a high value of correlation representing similarity, which is based on characteristic amounts extracted from a medical image V by anatomical information extraction unit 20, is selected from learned image storage unit 50. Specific characteristic amounts may include, for example, the positional relationship of bones, such as ribs, sternum, spine, and the like, and the size ratio of each organ and bone. Preferably, the comparison in characteristic amounts with the medical image of a subject is made after appropriately adjusting the contrast, size, and the like of the learned image.

Then, a comparison in anatomical characteristics with respect to a lung field and in anatomical characteristics with respect to a lung field peripheral area R between the lung field and one of a rib or the sternum is made between the extracted learned image and medical image V to detect an anatomical information difference (S202).

More specifically, the density ratio in the lung field between the normal learned image and medical image of the subject is calculated. Further, the density ratio in the lung field peripheral area R between the normal learned image and medical image of the subject is calculated. The term "density"

as used herein refers to a signal value of a medical image and, for example, a CT value of a CT image.

When a calcified region is present, the calcified region indicates a higher density than that of a normal region, so that an area of medical image representing a particular region having a density ratio to the density of the corresponding area of the learned image greater than a predetermined threshold value is detected as an anatomical characteristic difference.

Further, with respect to anatomical information of morphology, a comparison is made between the normal learned image and detected lung field peripheral area R. More specifically, if a pleural plaque is present, the lung field peripheral area R is thickened. Therefore, when the thickness of the detected lung field peripheral area R is greater than that of the lung field peripheral area R' of the normal learned image, the lung field peripheral area R is determined to be an anatomical information difference. When a two-dimensional medical image is used, a shortest distance between the lung field contour $S_0$ and a bone in the two-dimensional image may be used as an index of the thickness of the lung field peripheral area R. When the ratio of the thickness of the detected lung field peripheral area R to the thickness of the lung field peripheral area R' is greater than a predetermined threshold value, a point on the lung field contour $S_0$ where the distance between the lung field contour $S_0$ and a bone becomes shortest may be detected as an anatomical characteristic difference.

Here, if an image of a rib or the sternum is not found in the medical image V, the judgment of the thickness of the lung field peripheral area R is not performed. Further, when a two-dimensional image $V_2$ is used, a point E1 on a lung field contour which is shortest from a point D1 on a bone contour is detected using a known method, and a distance between the two points in the coordinate is used. When a three-dimensional image $V_3$ constituted by a stack of two-dimensional medical images $V_2$ is used, it is preferable that a point E1 on a lung field contour which is shortest from a point D2 on a bone contour in another two-dimensional medical image $V_2$ representing a tomographic image anatomically adjacent to the two-dimensional medical image $V_2$ is detected and the distance between the two pixels is calculated and used. The points D1, D2 on the bone contour may be set arbitrarily, and it is preferable, for example, to obtain the gravity center of the lung field from the density of the lung field and points on the contour of a bone closest to the gravity center are selected as points D1, D2.

Further, it is preferable that the intercostal vein in the detected medical image is recognized by anatomical information extraction unit 20 and compared with that of the normal medical image. The intercostal vein is located between two upper and lower ribs and looks like a pleural plaque in position and morphology. If this is recognized as the intercostal vein through a comparison with learned data of intercostal veins in normal lung fields, the region may be excluded from the pleural plaque candidate, and erroneous recognition may be prevented, allowing more accurate detection of depressed portion.

Then, pleural plaque candidate detection unit 40 detects the anatomical characteristic difference detected in the manner as described above as a second pleural plaque candidate $P_2$ (S203).

In this way, pleural plaque candidate detection unit 40 may detect the second pleural plaque candidate $P_2$.

As described above, the second embodiment may improve detection accuracy by detecting a pleural plaque candidate based on the anatomical information difference in conjunction with the depressed portion. Use of information of not only the lung field but also the lung field periphery, detection accuracy may further be improved. The following modifications may be applied to other embodiments without changing the principle.

As a modification, a method that determines that a calcified pleural plaque is present, if a maximum value of the density of the medical image is not less than a certain threshold value (e.g., CT value of 500), may be used in addition to the density ratio between the normal image and medical image when paying attention to the density of a pleural plaque. The combined judgments with respect to the density allow a pleural plaque candidate to be detected accurately.

In the second embodiment, anatomical difference detection unit 60 makes anatomical characteristic comparison with respect to the density of a lung field, the density of a lung field peripheral area R, and the thickness of the lung field peripheral area R, but as another modification, anatomical difference detection unit 60 may make anatomical characteristic comparison with respect to at least one of the density of a lung field, the density of a lung field peripheral area R, and the thickness of the lung field peripheral area R. When anatomical difference detection unit 60 makes anatomical characteristic comparison with respect to at least one of the density of a lung field, the density of a lung field peripheral area R, and the thickness of the lung field peripheral area R, a pleural plaque candidate may be detected based on the anatomical information difference in the compared anatomical characteristic, in addition to the pleural plaque candidate detection through the depression region detection, whereby a pleural plaque candidate may be detected more accurately.

Hereinafter, a third embodiment will be described.

As described above, the pleural plaque, in general, is irregular white plate like thickening developed in the parietal pleura. There may be a case in which such thickening outside of a lung is developed in patches and in such a case a pleural plaque may be detected as an uneven portion of the parietal pleura.

Consequently, in the third embodiment, a portion of a detected lung field contour $S_0$ having an unevenness value greater than a threshold value is detected as a third pleural plaque candidate, thereby providing diagnostic assistance.

Figure 13:
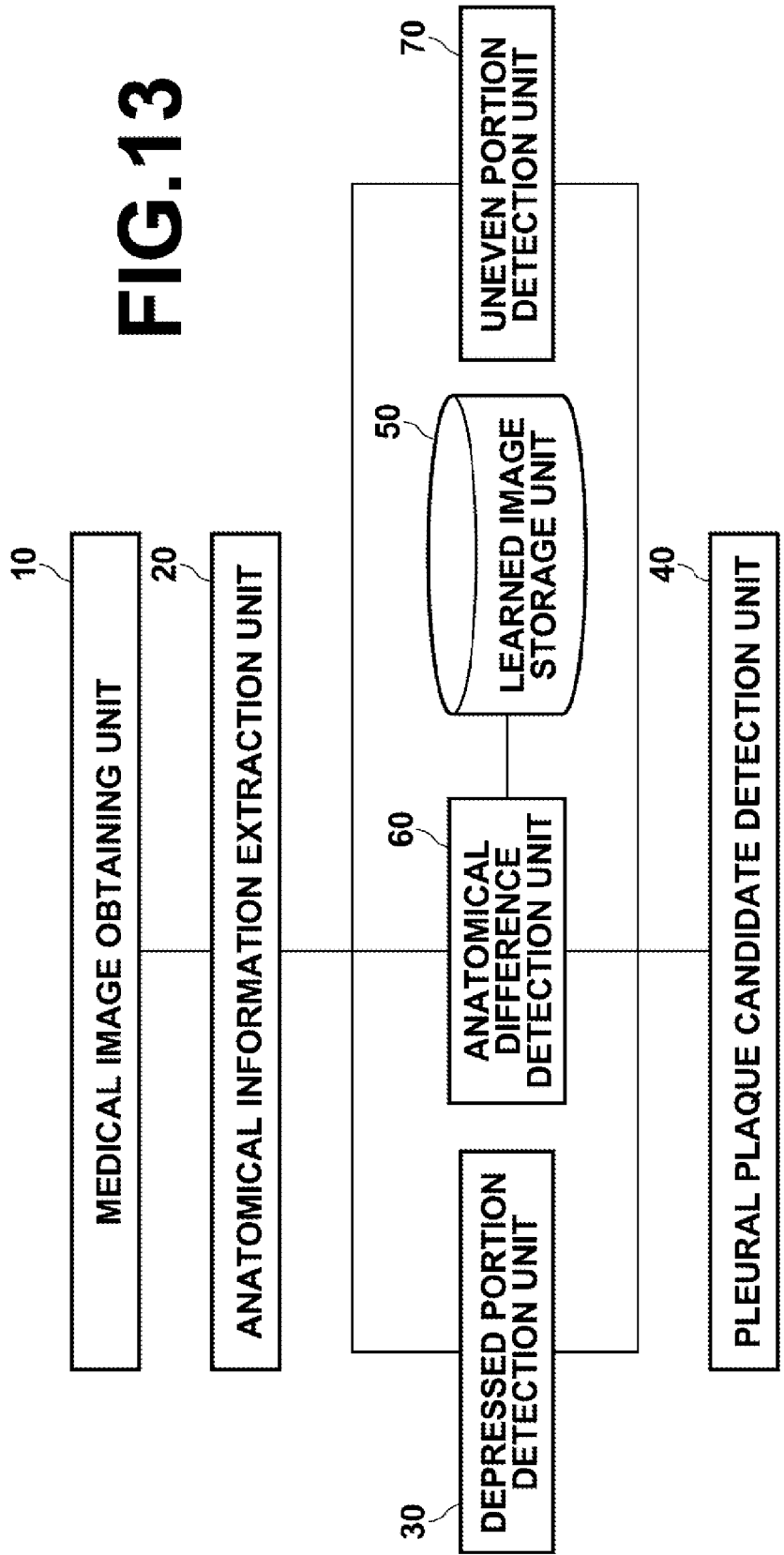
FIG. 13 is a block diagram of an image processing function of the modification of the third embodiment.

In the first embodiment, a first pleural plaque candidate $P_1$ is detected based on a depressed portion, while in the third embodiment, a pleural plaque candidate is detected by taking into account an uneven portion of a lung field contour in addition to a depressed portion. Note that the hardware configuration is identical to that of the first embodiment. Further, it is possible to apply the pleural plaque candidate detection function considering the anatomical difference in the second embodiment to the pleural plaque candidate detection function of the third embodiment, as illustrated in FIG. 13.

A configuration related to a medical image processing function according to the third embodiment of the present invention will now be described.

Figure 7:
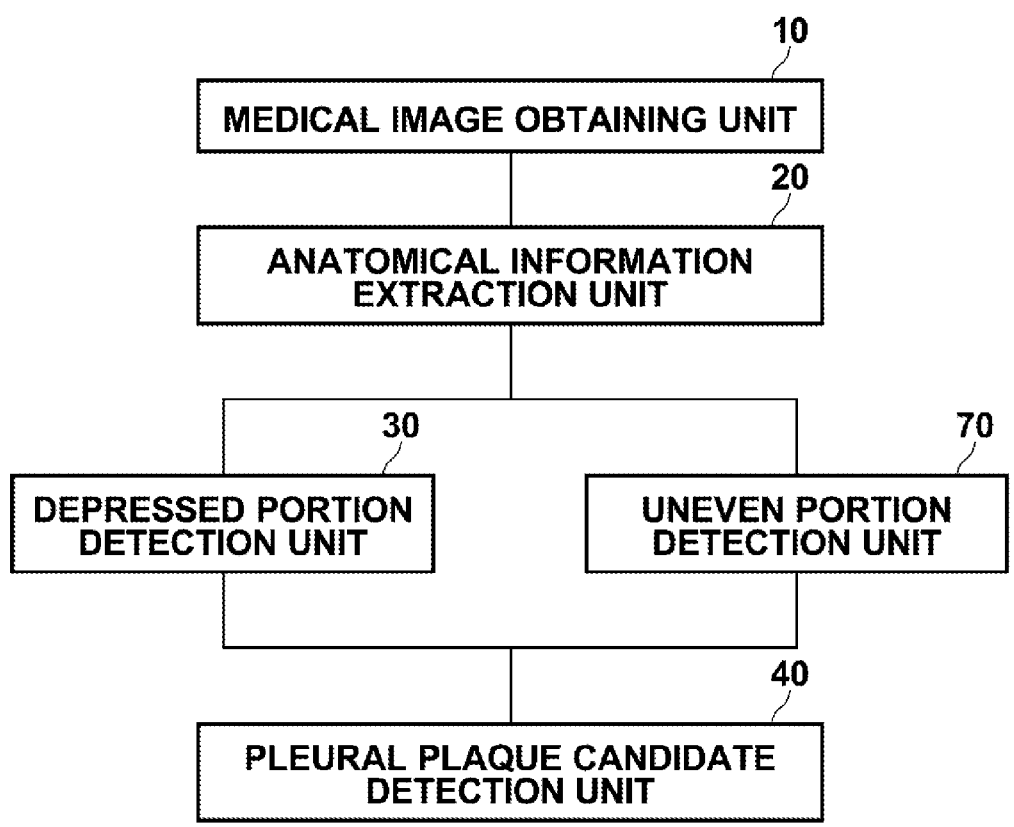
FIG. 7 is a block diagram of an image processing function according to a third embodiment.

FIG. 7 is a block diagram illustrating a portion of workstation 3 related to the medical image processing function according to the third embodiment of the present invention. As illustrated in FIG. 7, image processing workstation 3 includes uneven portion detection unit 70 for calculating roughness information of a lung field and detecting an uneven portion, which is a portion having a roughness value not less than a predetermined threshold value, in addition to the components shown in FIG. 2. Each of the components identical to that shown in FIG. 2 operates in the identical manner to that of FIG. 2.

Figure 8:
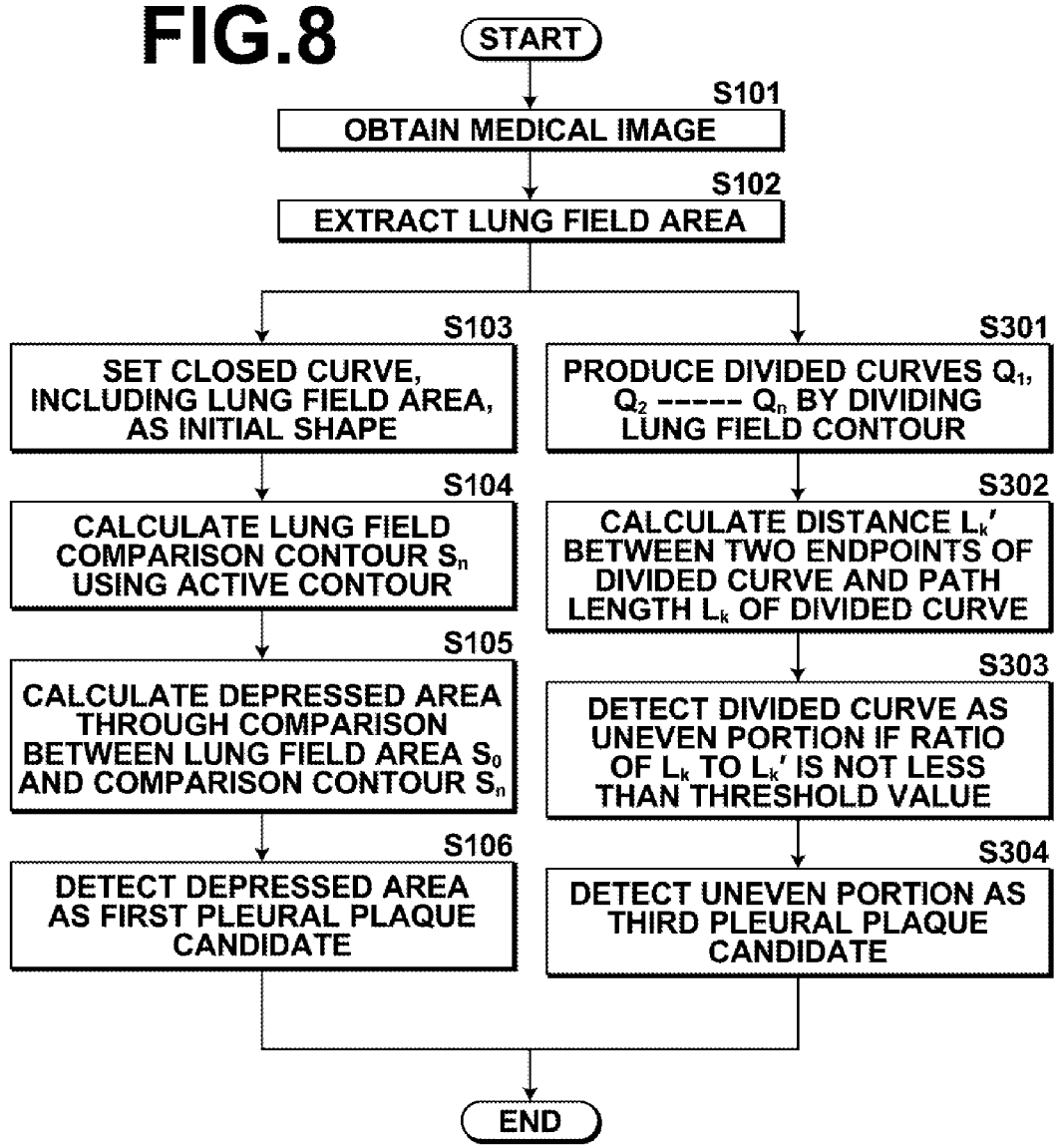
FIG. 8 is a flow diagram for explaining the flow of image processing in the third embodiment.

Hereinafter, a characteristic portion of the operation of the third embodiment will be described according to the flowchart of FIG. 8.

Figure 9:
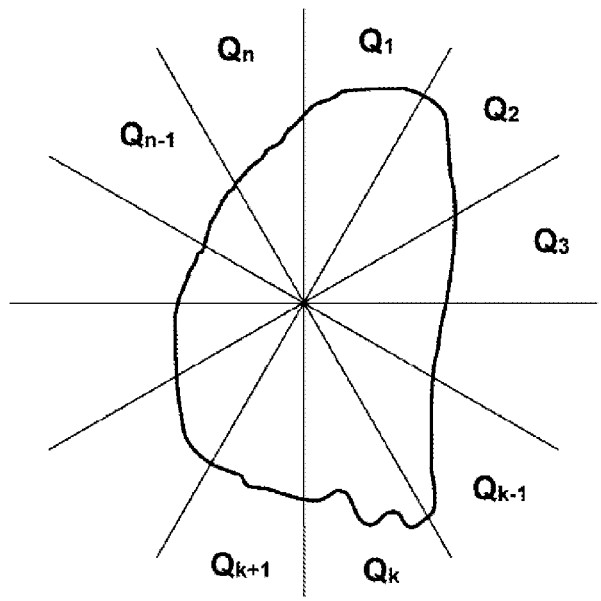
FIG. 9 is a diagram for explaining how to obtain a divided curve.
Figure 10:
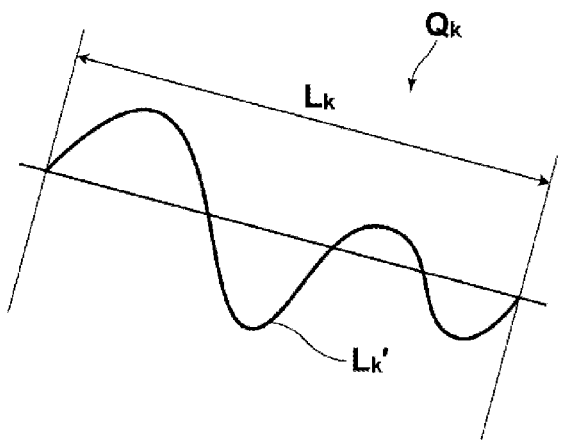
FIG. 10 is a diagram for explaining an evaluation method of roughness.

First, a lung field contour $S_0$ detected in step S102 is divided into n-divided curves $Q_k$ ($0 \leq k \leq n$) (S301). For example, each of the divided curves $Q_k$ may be divided so as to have a predetermined length, have a predetermined length ratio with respect to the path length of the lung field contour S0, or in the following manner. That is, a center point is set in the cavity of the lung field, then a plurality of linear lines is radially drawn passing through the center point and tilted in increments of a predetermined angle, and the lung field contour $S_0$ is divided at the intersection between the lung field contour $S_0$ and each of the plurality of liner lines, as illustrated in FIG. 9. In the third embodiment, the pixel coordinate center is used as the center point. The pixel coordinate center may be calculated as the average of the pixel coordinate. The term "so as to have a predetermined length" as used herein refers to that a lung field contour is divided such that the path length of each divided curve becomes a predetermined length or the distance between the two endpoints of each divided curve becomes a predetermined length. For example, the contour may be divided such that the length of each of the divided curves $Q_k$ becomes 15 mm or such that the entire contour length is divided into 30 divided curves.

Then, in order to calculate the roughness of a divided curve $Q_k$ having an uneven shape, the length $L_k$ along the path (length $L_k$ of the divided curve $Q_k$) and the length $L_k'$ between the two endpoints of the divided curve are calculated (S302). When a divided curve $Q_k$ is rough, the length $L_k$ of the divided curve $Q_k$ is longer than the length $L_k'$ between the two endpoints because of unevenness. Consequently, a comparison is made between the length $L_k'$ between the two endpoints and the length $L_k$ of the divided curve $Q_k$, and if the difference between them or the ratio of the length $L_k$ to the length $L_k'$ is not less than a predetermined threshold value, the divided curve $Q_k$ is detected as an uneven portion (S303).

Then, pleural plaque candidate detection unit 40 detects the uneven portion as a third pleural plaque candidate (S304).

The length $L_k'$ between the two endpoints of a divided curve may be obtained from coordinate values of pixels of the two points in the medical image using a general method of obtaining a liner distance between two points.

With respect to the contour $S_0$ and the length $L_k$ of a divided curve, a general method of obtaining a length of a curve connecting two points may be applied. In the third embodiment, the contour $S_0$ and divided curve $Q_k$ are approximated in a medical image with a quadric or cubic function, or a combination thereof, then coordinate values of pixels in a range for which a distance is to be calculated is obtained, and the function is integrated with respect to the coordinate value range, whereby the distance may be obtained.

Hereinafter, modifications will be described. The modifications may be combined with each other and applicable to other embodiments without changing the principle.

Figure 12:
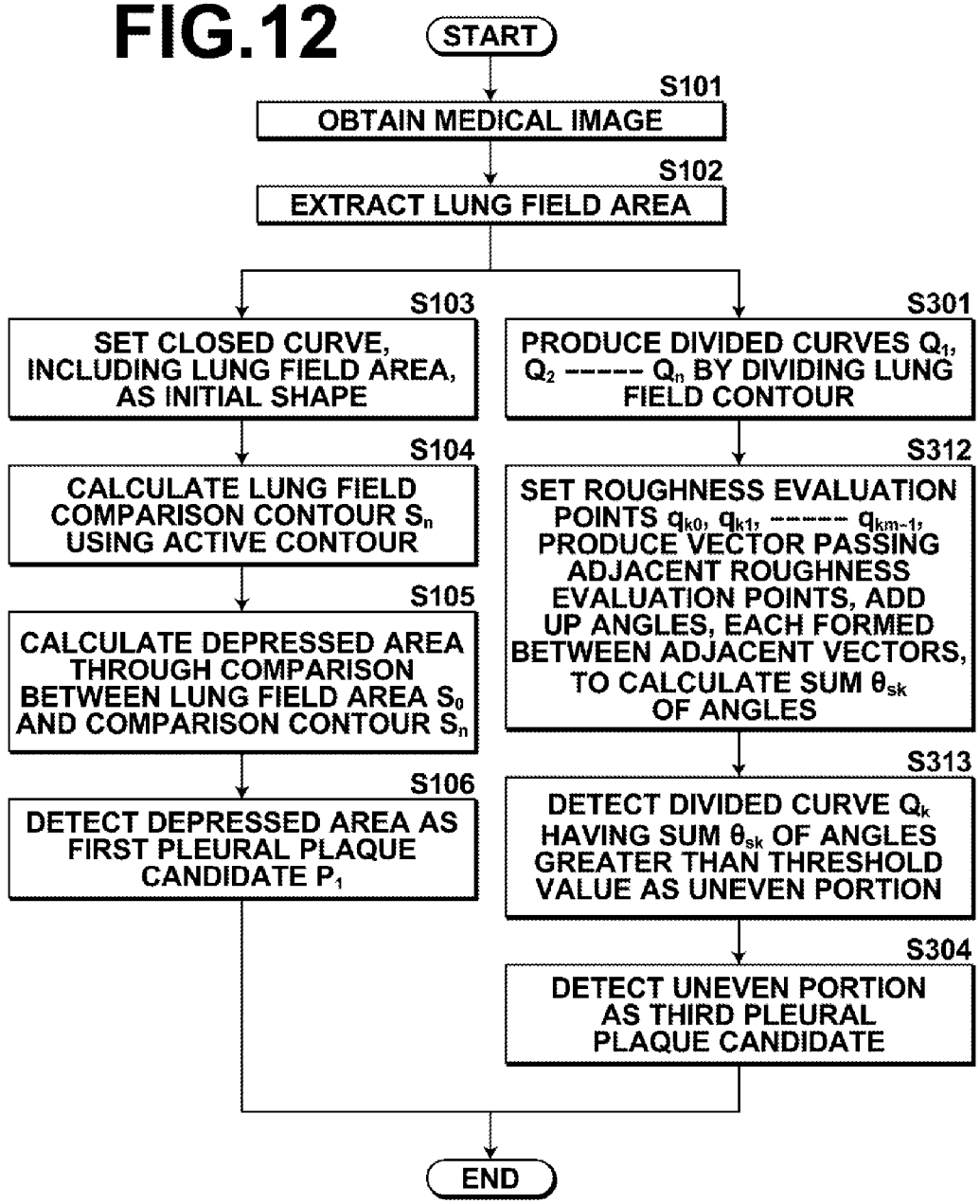
FIG. 12 is a flow diagram for explaining the flow of image processing in the modification of the third embodiment.

A modification of roughness information calculation and uneven portion detection will be described with reference to FIG. 12. FIG. 12 differs from FIG. 8 only in that steps S312 and S313 are performed instead of steps S302 and S303 respectively. Steps having the same step numbers in FIG. 12 perform processing identical to that in FIG. 8.

Figure 11:
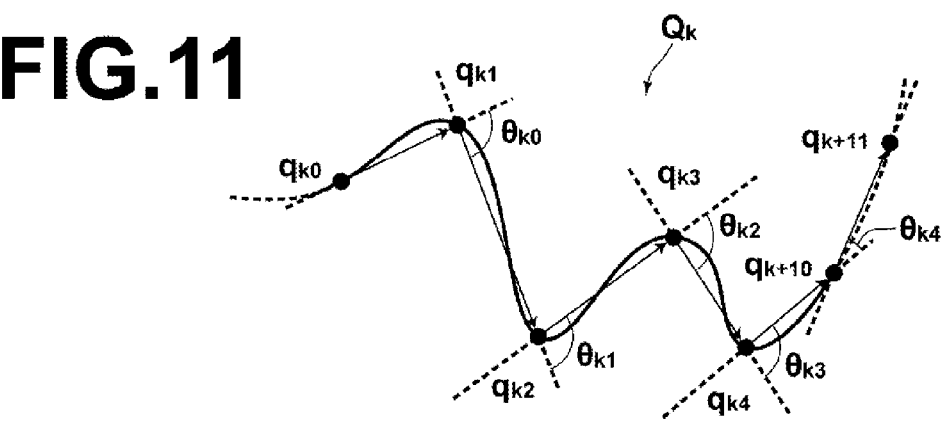
FIG. 11 is a diagram for explaining an evaluation method of a modification of the third embodiment.

As described above, whereas a normal lung field has a smooth contour, a lung field contour $S_0$ near a pleural plaque may sometimes have an uneven zigzag shape by the thickening of the pleural plaque. In such a case, a plurality of roughness evaluation points $q_{ki}$ is set on a divided curve $Q_k$ for evaluating the roughness, as illustrated in FIG. 11, then a vector directed from adjacent evaluation point $q_k$ to $q_{k+1}$ is produced, and the sum $\theta_{Sk}$ of angles $\theta_{ki}$, each being formed between adjacent vectors, is obtained. In a normal medical image, the angle between adjacent vectors does not change largely because the normal image has a smooth lung field contour $S_0$, while in an uneven zigzag shape, the angle between adjacent vectors changes largely. Consequently, when a lung field contour has an uneven zigzag shape, the sum $\theta_{Sk}$ of the angles becomes greater than that of a smooth lung field contour. Thus, the sum $\theta_{Sk}$ of the angles between adjacent linear lines may be used as an index of the roughness. That is, the sum $\theta_{Sk}$ of the angles between adjacent vectors may be compared with a predetermined threshold value and if the sum is greater than the threshold value, the divided curve $Q_k$ may be detected as an uneven portion.

A method of obtaining the roughness of a divided curve $Q_k$ in step S312 will be described in detail with reference to FIG. 11. In FIG. 11, the solid line represents divided curve $Q_k$, while $q_{k0}$, $q_{k1}$, $q_{k2}$, $q_{k3}$, $q_{k4}$, $q_{k+10}$, and $q_{k+11}$ represent roughness evaluation points, in which $q_{k0}$ and $q_{k+10}$ correspond to endpoints of the divided curve $Q_k$. First, m roughness evaluation points $q_{ki}$ ($0 \leq i \leq m-1$) are set on each divided curve $Q_k$, and a vector directed from $q_{ki}$ to $q_{k+2}$ is produced one after another, as illustrated in FIG. 11. Then, an angle $\theta_{ki}$ ($0 \leq i \leq m-1$) formed between two adjacent vectors is obtained, as illustrated in FIG. 11, and the sum $\theta_{sk}$ of these angles is obtained in the following manner (S312).

$$\theta_{sk} = \sum_{o \leq i \leq m-1} \theta_{ki} \qquad (3)$$

For example, in FIG. 11, the sum $\theta_{sk}$ is, $\theta_{sk} = \theta_{k0} + \theta_{k1} + \theta_{k2} + \theta_{k3} + \theta_{k4}$.

Although the number m of roughness evaluation points $q_{ki}$ for one divided curve $\theta_k$ is set to five for explanation purposes here, the number m of roughness evaluation points $q_{ki}$ may be set to any appropriate number, for example, to around ten. Further, the number m may be increased or decreased according to the length of the divided curve.

Further, the interval between roughness evaluation points $q_{ki}$ may be set arbitrarily. For example, X, Y, Z axes may be set on a medical image and the interval may be set such that coordinate values of pixels are arranged in an equal interval in any of the axis directions or such that the distance between adjacent roughness evaluation points becomes equal.

Then, when the sum $\theta_{sk}$ of the angles is greater than a predetermined threshold value, pleural plaque candidate detection unit 40 detects the divided curve $Q_k$ as an uneven portion (S313).

Preferably, an uneven portion is detected from a portion of a lung field contour $S_0$ and not from the entire lung field contour $S_0$. More specifically, it is preferable that an uneven portion is detected from a remaining contour of the lung field contour $S_0$ excluding a contour on the side that includes the heart. The reason is to prevent a contour of a different organ from being erroneously detected as a depressed portion and to improve accuracy of the detection of an uneven portion because the lung field contour $S_0$ may sometimes includes a contour of heart or blood vessel, as illustrated in FIG. 14.

An example method of removing a contour of a heart from a lung field contour $S_0$ will now be described. A contour of a heart may be detected by a known method like that used for recognizing a lung field by anatomical information extraction unit 20, and an uneven portion may be detected by uneven portion detection unit 30 through a comparison between the lung field contour $S_0$ and comparison contour $S_n$ with respect only to a partial contour excluding the contour of the heart from the lung field contour $S_0$.

Alternatively, an uneven portion may be detected by recognizing a sternum area and a spine area in the detected medical image V by anatomical information extraction unit 20, providing specific points B1, B2 in the sternum area and spine area respectively, setting a specific point C1 on the lung field contour such that the distance between the point B1 and point C1 becomes minimal, setting a specific point C2 on the lung field contour such that the distance between the point B2 and point C2 becomes minimal, dividing the lung field contour $S_0$ at the determined C1 and C2, and making a comparison between a remaining contour of the lung field contour $S_0$ excluding a contour on the side that includes the heart and comparison contour $S_n$.

A third pleural plaque candidate $P_3$ may be detected in the manner as described above. In this way, a pleural plaque candidate may be detected by detecting an uneven portion based on roughness, which does not require administration of a contrast agent to a patient, whereby the burden on the patient and diagnostic cost may be reduced. Further, a pleural plaque candidate may be detected from a wide area with respect to the entirety of the pleura along the lung field contour $S_0$, whereby detection accuracy may be improved. Further, pleural plaque candidate detection based on depressed portion in combination with anatomical difference may further improve the detection accuracy.

In the configuration in which the second and third embodiments are combined, as shown in FIG. 13, when two or more of the first pleural plaque candidate $P_1$, second pleural plaque candidate $P_2$, and third the pleural plaque candidate $P_3$ are detected and the plurality of detected pleural plaque candidates indicate substantially an overlapping area, the pleural plaque candidate may be weighted as being a high probability pleural plaque candidate and the weight information may be attached, as additional information, to the pleural plaque candidate by pleural plaque candidate detection unit 40.

Weighting of a pleural plaque candidate and attaching weigh information to the candidate when detected by a plurality of different methods may provide an index indicating that the detected candidate is highly likely a pleural plaque, whereby diagnostic assistance capable of providing detailed information with respect to the pleural plaque candidate may be provided.

So far the description has been made of a case in which image data processing is performed using one image storage server 2, but a plurality of servers linked via a network and operate in coordination may be used.

What is claimed is:

1. A medical image processing apparatus, comprising:
   a medical image obtaining unit configured to obtain a medical image representing a subject;
   an anatomical information extraction unit configured to extract a lung contour from the obtained medical image, said lung contour finely showing a depressed shape portion therein;
   a depressed portion detection unit configured to compare the extracted lung contour with a comparison contour showing a shape of a lung smoother than the lung contour and that detects a different portion bet en the extracted lung contour and the comparison contour as a depressed portion of the extracted lung, wherein the comparison contour is obtained from the medical image by deforming an active curve having an initial shape in the lung a plurality of times until given conditions are met according to a certain deformation trend; and
   a pleural plaque candidate detection unit configured to determine the detected depressed portion as a first pleural plaque candidate.

2. The medical image processing apparatus of claim 1, further comprising:
   a learned image storage unit configured to record a learned image obtained by learning image data that include lung field related images representing normal lung field areas; and
   an anatomical difference detection unit configured to compare the detected extracted lung contour with the learned image and configured to detect an anatomical information difference between them,
   wherein the pleural plaque candidate detection unit is a unit that is further configured to determine the detected anatomical information difference as a second pleural plaque candidate.

3. The medical image processing apparatus of claim 2, wherein:
   the obtained medical image includes a lung field peripheral area between at least either one of a rib and sternum and a lung field; and
   the anatomical difference detection unit is a unit that is configured to compare, instead of a lung field area, at least either one of a signal value of the lung field peripheral area and a thickness of the lung field peripheral area of the medical image with the learned image.

4. The medical image processing apparatus of claim 1, further comprising an uneven portion detection unit configured to detect, by calculating roughness of a peripheral wall of the lung contour of the detected lung contour and comparing a calculated roughness value with a predetermined value, an uneven portion of the peripheral wall of the lung field area,
   wherein the pleural plaque candidate detection unit is a unit further configured to determine the detected uneven portion as a third pleural plaque candidate.

5. The medical image processing apparatus of claim 4, wherein:
   the obtained medical image includes a two-dimensional image; and
   the uneven portion detection unit is a unit configured to provide divided curves by dividing the contour of the extracted lung contour of the two-dimensional image and configured to detect a specific section in which the length of a divided curve is greater, by more than a predetermined value, than the distance between two endpoints of the divided curve as an uneven portion.

6. The medical image processing apparatus of claim 4, wherein:
   the medical image includes a two-dimensional image; and
   the uneven portion detection unit is a unit configured to provide divided curves by dividing the peripheral wall of the lung contour of the two-dimensional image into predetermined sections, configured to dispose a plurality of points on each of the divided curves, configured to produce a plurality of vectors by connecting adjacent points of the plurality of points, obtains an added-up value of angles, each being formed between adjacent vectors of the plurality of vectors, and configured to detect a predetermined section in which the added-up value is greater than a predetermined value as an uneven portion.

7. The medical image processing apparatus of claim 4, wherein the uneven portion detection unit is a unit configured to determine the divided curves based on any one of a preset length, a ratio of a length of each of the divided curves to a path length of the contour of the lung, and a predetermined angle from a center point within the lung field area.

8. The medical image processing apparatus of claim 1, wherein:
the medical image includes a plurality of two-dimensional image or a three-dimensional image;
the depressed portion detection unit is a unit configured to detect the depressed portion from the plurality of two-dimensional image or the three-dimensional image.

9. The medical image processing apparatus of claim 1, wherein:
the medical image includes a plurality of two-dimensional image and a three-dimensional image;
the depressed portion detection unit is a unit configured to detect the depressed portion from a first two-dimensional image and configured to obtain, according to the detection of the depressed portion, another comparison contour calculated using the three-dimensional image or a second two-dimensional image, which is different from the first two-dimensional image, that includes an adjacent area of the depressed portion from the anatomical information extraction unit, and further configured to detect another depressed portion in the adjacent area of the depressed portion using the another comparison contour; and
the pleural plaque candidate detection unit is a unit configured to determine the depressed portion and the another depressed portion as the first pleural plaque candidate.

10. A medical image processing method, comprising the steps of:
obtaining, by a computer, a medical image representing a subject;
extracting a lung contour from the obtained medical image, said lung contour finely showing a depressed shape portion therein;
comparing, by a computer, the extracted lung contour with a comparison contour showing a shape of a lung smoother than the lung contour and detecting a different portion between the extracted lung contour and the comparison contour as a depressed portion of the extracted lung, wherein the comparison contour is obtained from the medical image by deforming an active curve having an initial shape in the lung a plurality of times until a given conditions are met according to a certain deformation trend; and
determining the detected depressed portion as a first pleural plaque candidate.

11. A non-transitory computer readable recording medium on which is recorded a program for causing a computer to function as:
a medical image obtaining unit that obtains a medical image representing a subject;
an anatomical information extraction unit that extracts a lung contour from the obtained medical image, said lung contour finely showing a depressed shape portion therein;
a depressed portion detection unit that compares the lung contour with a comparison contour showing a shape of a lung smoother than the lung contour and that detects a different portion between the extracted lung contour and the comparison contour as a depressed portion of the extracted lung, wherein the comparison contour is obtained from the medical image by deforming an active curve having an initial shape in the lung a plurality of times until given conditions are met according to a certain deformation trend; and
a pleural plaque candidate detection unit that determines the detected depressed portion as a first pleural plaque candidate.

* * * * *